(12) United States Patent
Nishikawa

(10) Patent No.: US 11,777,819 B2
(45) Date of Patent: Oct. 3, 2023

(54) MANAGEMENT APPARATUS AND METHOD

(71) Applicant: CANON KABUSHIKI KAISHA, Tokyo (JP)

(72) Inventor: Satoshi Nishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/342,392

(22) Filed: Jun. 8, 2021

(65) Prior Publication Data

US 2021/0392057 A1    Dec. 16, 2021

(30) Foreign Application Priority Data

Jun. 15, 2020   (JP) ................................. 2020-103371

(51) Int. Cl.
    *H04L 41/5051*    (2022.01)
    *H04L 41/5054*    (2022.01)

(52) U.S. Cl.
    CPC ...... *H04L 41/5051* (2013.01); *H04L 41/5054* (2013.01)

(58) Field of Classification Search
    CPC .................. H04L 41/5051; H04L 41/5054
    See application file for complete search history.

(56) References Cited

U.S. PATENT DOCUMENTS

| | | | | |
|---|---|---|---|---|
| 8,689,242 B2 * | 4/2014 | Nagashima | ........... | G06F 3/1204 719/327 |
| 2006/0259317 A1 | 11/2006 | Nakazawa | | |
| 2007/0247664 A1 * | 10/2007 | Yamamoto | ........... | G06F 3/1226 358/1.16 |
| 2012/0239791 A1 | 9/2012 | Takamoto | | |
| 2013/0321834 A1 | 12/2013 | Suzuki | | |
| 2014/0078531 A1 * | 3/2014 | Park | ...................... | G06F 3/1291 358/1.13 |
| 2016/0241456 A1 * | 8/2016 | Nagashima | ........... | H04L 41/085 |
| 2017/0013110 A1 | 1/2017 | Sato | | |
| 2018/0007215 A1 * | 1/2018 | Zakharov | ........... | H04N 1/00172 |
| 2018/0173469 A1 * | 6/2018 | Hirasawa | .............. | G06F 3/1256 |
| 2018/0232503 A1 * | 8/2018 | Tsuboi | .................. | G06F 21/121 |
| 2018/0302363 A1 * | 10/2018 | Abedini | .................. | H04W 4/02 |
| 2019/0087135 A1 * | 3/2019 | Ueda | ....................... | G06F 3/1205 |
| 2019/0332332 A1 | 10/2019 | Yoshida et al. | | |
| 2020/0150870 A1 * | 5/2020 | Miyamoto | ............ | G06F 3/0676 |
| 2020/0244827 A1 * | 7/2020 | Miyazawa | ......... | H04N 1/00477 |
| 2020/0394000 A1 | 12/2020 | Takamoto | | |

FOREIGN PATENT DOCUMENTS

| | | |
|---|---|---|
| JP | 2010147790 A | 7/2010 |
| JP | 2013012245 A | 1/2013 |
| JP | 2014002567 A | 1/2014 |
| JP | 2014115955 A | 6/2014 |
| JP | 2015176594 A | 10/2015 |

* cited by examiner

*Primary Examiner* — John A Follansbee
*Assistant Examiner* — Raqiul A Choudhury
(74) *Attorney, Agent, or Firm* — Canon U.S.A., Inc. IP Division

(57) ABSTRACT

A management apparatus that manages network devices through a network manages information about network devices registered as management targets and executes a third type task in a case where a new network device satisfying a predetermined condition is found in a search, thereby automatically executing a plurality of tasks for the found network device.

53 Claims, 19 Drawing Sheets

FIG.5A

| | DEVICE NAME | MODEL NAME | IP ADDRESS | SERIAL NUMBER |
|---|---|---|---|---|
| ☐ | DEVICE 1 | MFC1 | 192.168.10.87 | 18993354 |
| ☐ | DEVICE 2 | MFC2 | 192.168.10.100 | 18993344 |
| ☐ | DEVICE 3 | MFC3 | 192.168.10.110 | 18993343 |

DEVICE   TASK   SELECT ALL   DESELECT ALL   SET

FIG.5B

| | DEVICE NAME | MODEL NAME | IP ADDRESS | SERIAL NUMBER |
|---|---|---|---|---|
| ☐ | DEVICE 1 | MFC1 | 192.168.10.87 | 18993354 |
| ☐ | DEVICE 2 | MFC2 | 192.168.10.100 | 18993344 |
| ☐ | DEVICE 3 | MFC3 | 192.168.10.110 | 18993343 |
| ☐ | DEVICE 4 | MFC2 | 172.20.101.200 | 18993200 |

DEVICE   TASK   SELECT ALL   DESELECT ALL   SET

FIG.8A

| DEVICE | TASK | | ✕ |
|---|---|---|---|

TEMPORARY TASK

REPORTING

DEVICE MONITORING

COMBINED TASK

TASK

| TASK NAME | STATUS | SCHEDULE |
|---|---|---|
| REPORT 1 | IN PROGRESS | 5PM EVERY DAY |

LOG  ALL STATUSES

| TASK NAME | STATUS | TARGET | DATE AND TIME |
|---|---|---|---|
| REPORT 1 | COMPLETED | 2 | 3/3 17:00 |

FIG.8B

| DEVICE | TASK | | ✕ |
|---|---|---|---|

TEMPORARY TASK

REPORTING

DEVICE MONITORING

COMBINED TASK

TASK                                    CREATE

| TASK NAME | STATUS | TARGET |
|---|---|---|
|  |  |  |

LOG  ALL STATUSES

| TASK NAME | STATUS | APPLICABLE DEVICE | DATE AND TIME |
|---|---|---|---|
|  |  |  |  |

MANAGEMENT APPARATUS AND METHOD

BACKGROUND

Field of the Disclosure

The present disclosure relates to a technique for managing network devices including an image processing apparatus, through a network.

Description of the Related Art

There is conventionally known a device management system that acquires data such as operation information from image processing apparatuses (hereinafter referred to as devices) such as printers and multifunction peripherals, and manages the devices. The number of devices manageable by one management apparatus has increased, considering an increase in the number of devices to be managed, a reduction in server cost, and maintenance.

The device management system preliminarily creates a template for an operation to be performed, as a profile. The device management system then generally creates a task with a target device specified, based on the profile and executes the task based on a condition, thereby performing management and setting of the device, information collection from the device, and the like. In addition, for processing such as processing not required frequently or processing required unexpectedly, a task corresponding to the processing is created with a target device specified and is immediately executed without an execution condition set in advance.

The device management system may have a reporting function that acquires, from each device, information about the total number of print pages, the status, and the service life of the supplies and then reports the information. Japanese Patent Application Laid-Open No. 2013-12245 discusses a technique in which a tabulation unit tabulates data on a department-by-department basis based on the information collected from each device and outputs the data to a file in order to prompt a user to improve cost consciousness.

The conventional device management system executes a task with a target device and a tabulation processing schedule specified, using a timer based on the schedule. The conventional device management system then outputs, as a result of the task, a tabulation result to a file.

In the conventional technique, it is necessary to specify a target device at the time of creating a task. Thus, a device newly installed in the management target network after the creation of the task cannot be managed by executing the task. This requires the device administrator to create a task again for such a device.

SUMMARY

According to an aspect of the present disclosure, a management apparatus includes at least one memory storing instructions, and at least one processor executing the instructions causing the management apparatus to manage information about network devices registered as management targets, execute a first type task for a target network device selected from among the management targets, wherein the first type task is executed regularly or at a predetermined frequency based on a schedule set for the first type task, execute a second type task for a target network device selected from among the management targets, wherein the second type task is executed without a set schedule, as a setting for a third type task, set a condition for determining a target network device for the third type task, wherein the third type task enables execution of a plurality of tasks including at least one of the first type task or the second type task, perform a search for a network device on a network to which the management apparatus is connected, and execute the third type task in a case where a network device that is not included in the management targets and satisfies the set condition is found in the search, thereby executing the plurality of tasks including the at least one of the first type task or the second type task for the found network device.

Further features of the present disclosure will become apparent from the following description of exemplary embodiments with reference to the attached drawings.

BRIEF DESCRIPTION OF THE DRAWINGS

FIGS. 5A and 5B are diagrams each illustrating a screen (device list) provided by the device management server.

FIGS. 8A to 8E are diagrams each illustrating a screen that is related to a combined task and is provided by the device management server.

DESCRIPTION OF THE EMBODIMENTS

<System Configuration>

Figure 1:
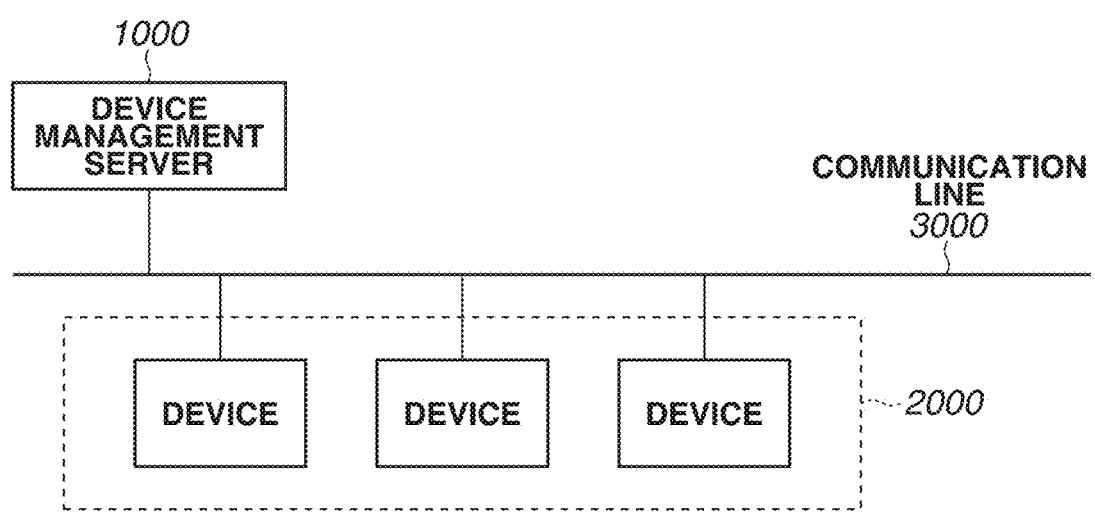
FIG. 1 is a schematic diagram illustrating a configuration of a device management system according to one or more aspects of the present disclosure.

FIG. 1 is a schematic diagram illustrating a configuration of a device management system according to an exemplary embodiment of the present disclosure. The system illustrated in FIG. 1 includes a device management server 1000 and a plurality of devices 2000.

Each of the devices 2000 is a network device connectable to a network, for example, an image processing apparatus such as a printer or a multifunction peripheral. Each of the devices 2000 receives print data through the network, and performs printing on actual paper by using a known printing technique such as an electrophotographic technique or an inkjet technique. Each of the devices 2000 also has a function of scanning a paper document through a scanner to copy the document or to convert the document to image data and transmit the image data by e-mail. Alternatively, the device 2000 can be a printer not having a copy function. The device management server 1000 and each of the devices 2000 are communicably connected to each other through a communication line 3000. The communication line 3000 may be wired or wireless.

Figure 3:
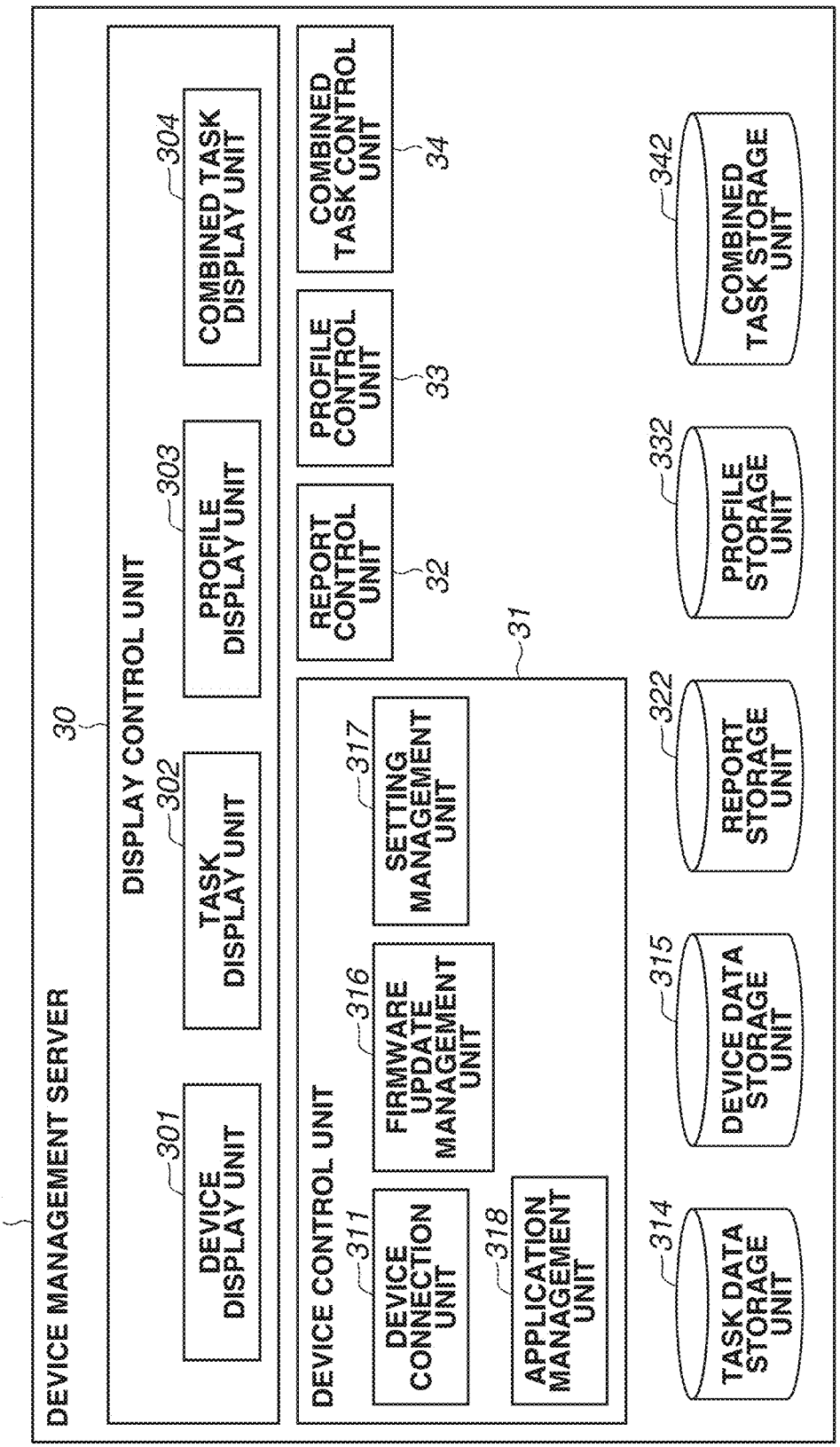
FIG. 3 is a block diagram illustrating an example of a software module configuration of a device management server.

The device management server 1000 is an information processing apparatus that executes device management software for managing the devices 2000. The device management software is a program for implementing a display control unit 30, a device control unit 31, a report control unit 32, a profile control unit 33, and a combined task control unit 34 that are illustrated in FIG. 3 (described below).

<Hardware Configuration of Device Management Server>

Figure 2:
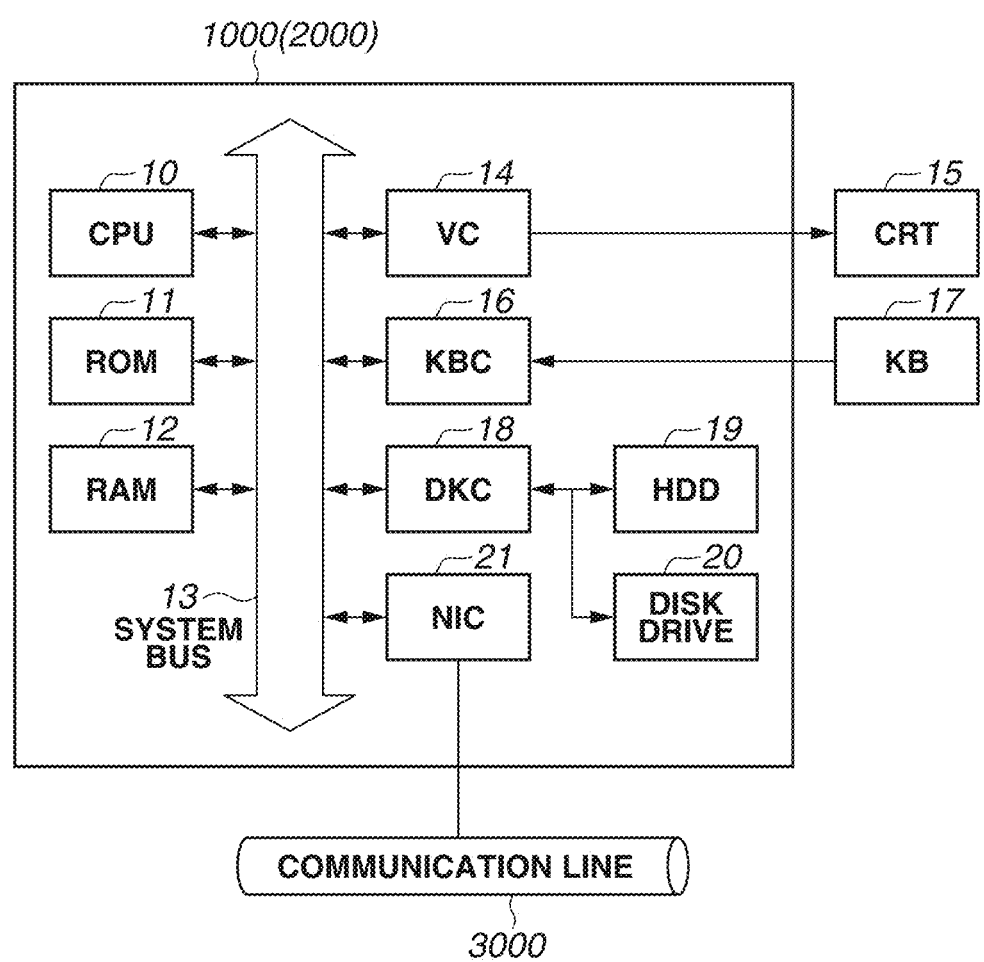
FIG. 2 is a block diagram illustrating an example of an internal configuration of an information processing apparatus.

FIG. 2 illustrates a hardware configuration of an information processing apparatus serving as each of the device management server 1000 and the devices 2000. Each of the devices 2000 includes, in addition to the illustrated configuration, dedicated hardware (not illustrated) for a printer, a scanner, a facsimile (FAX), or the like.

A central processing unit (CPU) 10 executes various kinds of programs, such as an operating system (OS) and device management software, stored in a read only memory (ROM) 11 and a hard disk drive (HDD) 19, by using a random access memory (RAM) 12 as a work area. The components of the information processing apparatus are connected to each other through a system bus 13. The information processing apparatus further includes a disk controller (DKC) 18, a disk drive 20 on which a recording medium such as a compact disc read only memory (CD-ROM), a digital versatile disc (DVD), magnetic tape, or an integrated circuit (IC) memory card is mountable, a video card (VC) 14, and a display device (cathode-ray tube (CRT)) 15. The information processing apparatus further includes a keyboard controller (KBC) 16, a keyboard (KB) 17, and a pointing device (not illustrated) such as a mouse. The information processing apparatus performs data communication with an apparatus on the communication line 3000 through a network interface card (NIC) 21.

<Software Configuration of Device Management Server>

FIG. 3 illustrates a configuration example of modules implemented by the software operating on the device management server 1000. The display control unit 30, the device control unit 31, the report control unit 32, the profile control unit 33, and the combined task control unit 34 in the configuration example perform processing (described below) implemented by executing the device management software, and are executed by the CPU 10 on the RAM 12, the ROM 11, and the HDD 19 illustrated in FIG. 2.

The display control unit 30 includes a device display unit 301, a task display unit 302, a profile display unit 303, and a combined task display unit 304. The device control unit 31 includes a device connection unit 311, a task data storage unit 314, a device data storage unit 315, a firmware update management unit 316, a setting management unit 317, and an application management unit 318. The report control unit 32 includes a report storage unit 322.

The display control unit 30 controls the display of a screen (user interface (UI)) provided to a display of the device management server 1000 or an external web browser connected through the network. More specifically, the device display unit 301 controls the UI of the device control unit 31, the task display unit 302 controls the UI and task display of the report control unit 32, the combined task display unit 304 controls the UI of the combined task control unit 34, and the profile display unit 303 controls the UI of the profile control unit 33. The display control unit 30 can also be implemented as a web-based application. In this case, the display control unit 30 is usable through a web browser.

The device connection unit 311 has a function of performing a device search, collecting device information, and performing device setting. The device control unit 31 has a function of executing a task that is created by the device connection unit 311 or the report control unit 32 and is stored in the task data storage unit 314 or the device data storage unit 315. The device control unit 31 instructs the device connection unit 311, the report control unit 32, the firmware update management unit 316, the setting management unit 317, or the application management unit 318 to execute the task stored in the task data storage unit 314, based on the schedule set for the task or in response to an immediate execution instruction, and stores a result of the task in the task data storage unit 314.

Examples of the task of the device connection unit 311 include a device search function for the devices 2000 that uses simple network management protocol (SNMP), internee protocol (IP) broadcast, service location protocol (SLP) multicast, or the like. When performing this function, the device connection unit 311 searches for the devices 2000 at an optional timing. The device connection unit 311 also has a function of acquiring or changing device information such as a management information base (MIB) through the communication line 3000 such as a local area network (LAN). In addition, the device connection unit 311 acquires, as a result of the search, device information such as a device name, a model name, and an IP address, and stores the device information in the device data storage unit 315.

Each of the task data storage unit 314 and the device data storage unit 315 is a data recording medium such as a database operating on the HDD 19, and stores table data such as a task list and a device list therein.

The firmware update management unit 316 has a function of updating firmware and checking the latest firmware. The setting management unit 317 has a function of distributing settings to each of the devices 2000 (a setting edit function) and a backup function of storing the settings for each of the devices 2000. The application management unit 318 has a function of validating applications and functions operating on each of the devices 2000. The report control unit 32 generates and manages a report about information acquired from the device control unit 31, and stores the report the report storage unit 322.

The profile control unit 33 creates and manages a profile as a template of, for example, a device report, and stores the profile in a profile storage unit 332.

The combined task control unit 34 creates and manages a combined task that enables the execution of a combination of tasks such as device search, report generation, firmware update, setting edit, setting backup, and application validation, and stores the combined task in a combined task storage unit 342.

<Software Configuration of Device>

Figure 4:
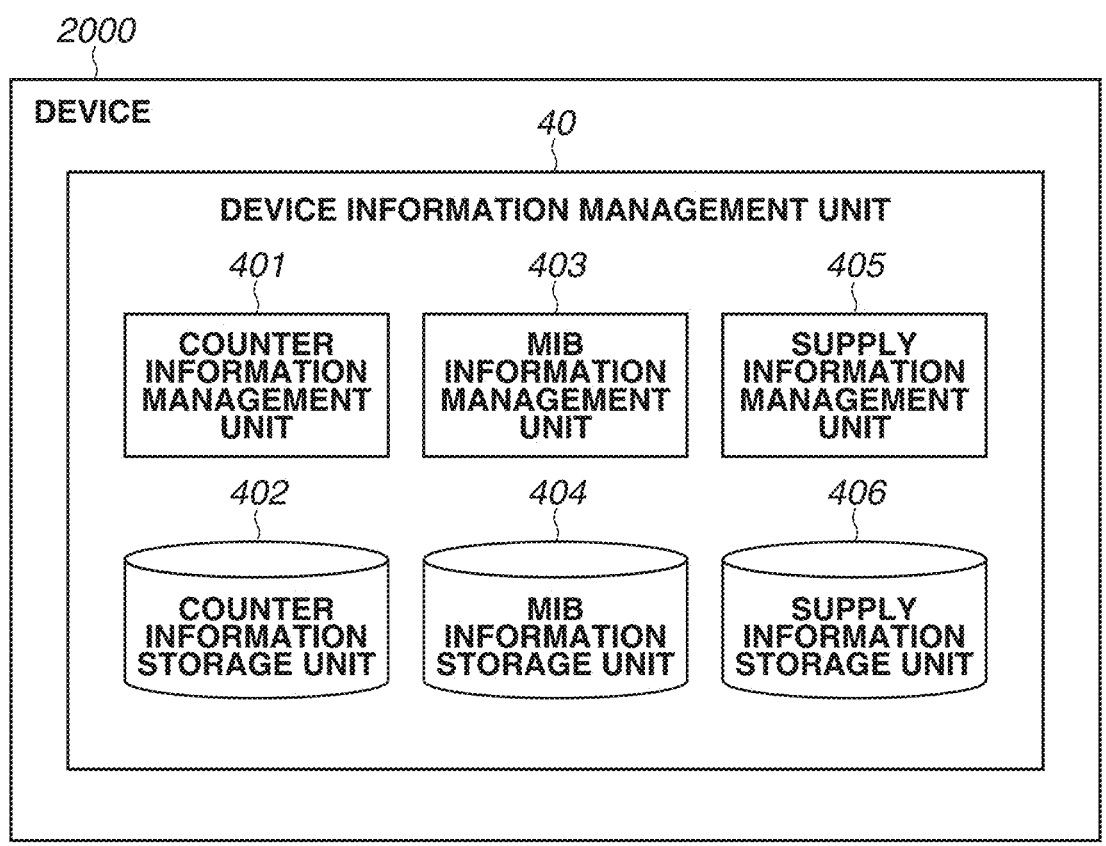
FIG. 4 is a block diagram illustrating an example of an internal configuration of an image processing apparatus.

FIG. 4 illustrates a configuration example of modules implemented by software operating on each of the devices 2000.

Each of the device 2000 includes a device information management unit 40 that manages information such as own device identification information, network information, operation information (counter information and consumable information). A counter information management unit 401 manages information such as the number of print pages for each function used and the usage frequency of each component, and stores the information in a counter information storage unit 402. An MIB information management unit 403 manages MIB information indicating information such as the device identification information described above, status information, and configuration information, and stores the MIB information in an MIB information storage unit 404. A supply information management unit 405 manages information such the replacement frequency of each of recording materials and supplies, and stores the information in a supply information storage unit 406. The recording materials include toner and ink. Each of the pieces of information is transmitted to the device management server 1000 using SNMP or other protocol in response to a request from the device management server 1000.

<Task Creation Flow>

FIG. 5A to FIG. 9 each illustrate an example of a screen provided by the device management server 1000. A task creation flow will be described with reference to FIG. 5A to FIG. 9.

FIG. 5A illustrates an example of a screen that displays a device list as a device search result, which is provided by the device management server 1000. The device management server 1000 searches the network to find devices to be managed. As an algorithm for the device search, the SNMP algorithm is used, for example, but the algorithm is not limited thereto. The device list displays, as information about the devices found in the search, the names of the devices and identification information (e.g., model name, IP address, and serial number) about the devices. In this example, Devices 1, 2, and 3 have been found in the search.

Figure 6:
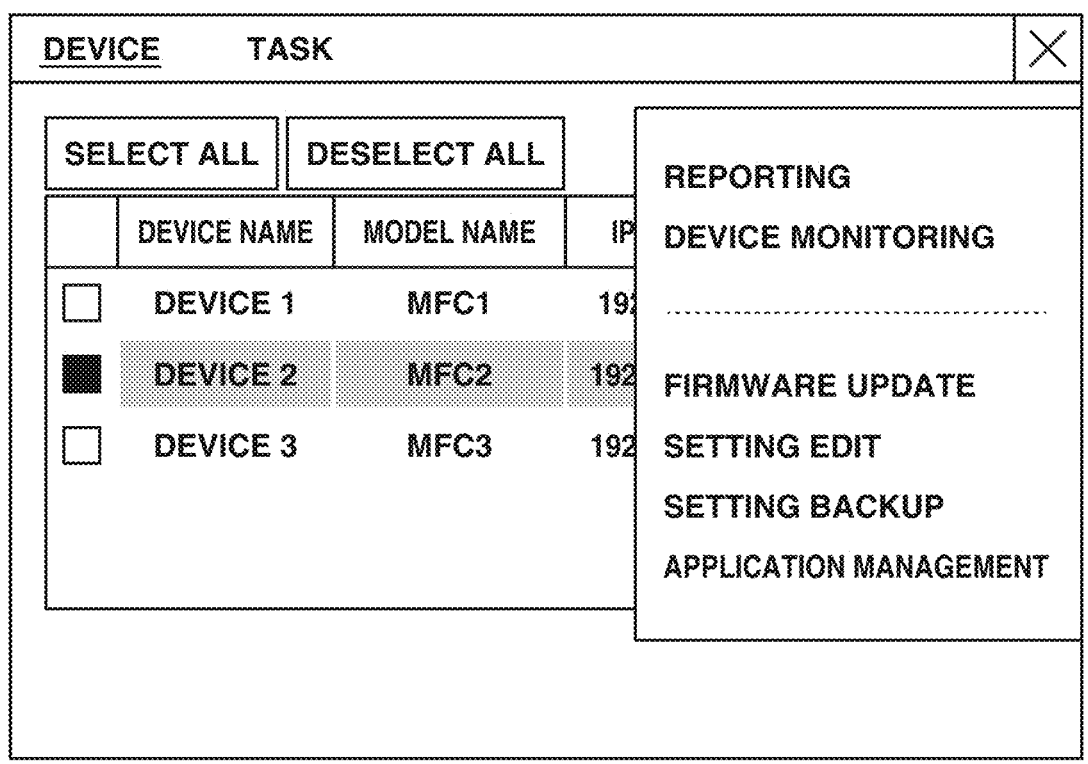
FIG. 6 is a diagram illustrating a screen (task menu) provided by the device management server.

FIG. 6 illustrates an example of a screen including a task menu that is used to create a task after a device is selected. To create a task, first, the user selects a target device, which causes the task menu to be displayed. For example, the user selects a target device by checking a checkbox illustrated in FIG. 5A. In the task menu, tasks settable for the target device are listed. In this example, as selectable tasks, reporting, device monitoring, firmware update, setting edit, setting backup, and application management are listed. The settable tasks are determined based on, for example, the type and functions of the target device.

<Definition of Task Type>

The task is roughly classified into two types: first type and second type. The first type task is a task for automatically performing processing regularly or at a predetermined frequency based on a schedule, according to a preliminarily created profile in which the operation contents of the task for the target device are set. The second type task (hereinafter also referred to as a temporary task) is a task that is immediately performed in response to an instruction input by a user who is an operator of the device management server 1000, according to the input instruction with specified settings.

Figure 7A:
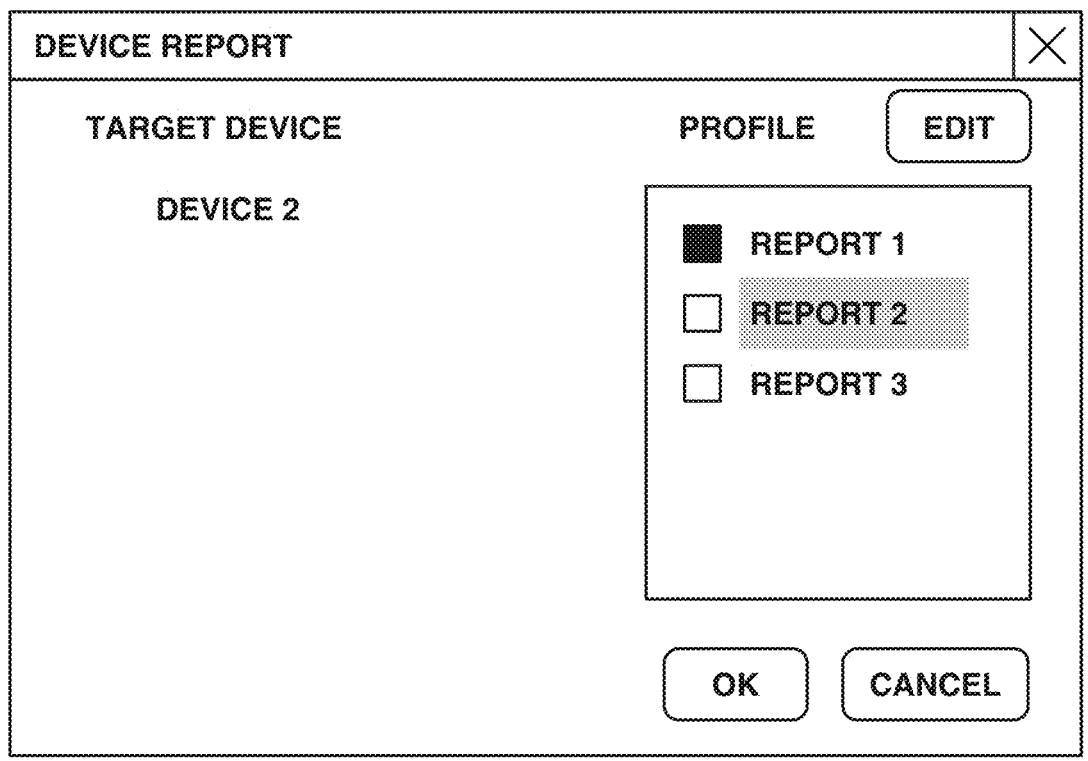
FIGS. 7A and 7B are diagrams each illustrating a task setting screen provided by the device management server.

As an example of the regular task, a reporting task will be described first with reference to FIG. 7A. In the reporting task, a device report is automatically generated based on status information or log information collected from the target device. When selecting "Reporting" from the task menu of FIG. 6, the user then selects a profile as a template for the task. At this time, the selected target device and selectable profiles are displayed. The profiles created in advance are listed at this time, but can be edited using an Edit button. A new profile can also be created.

Figure 9:
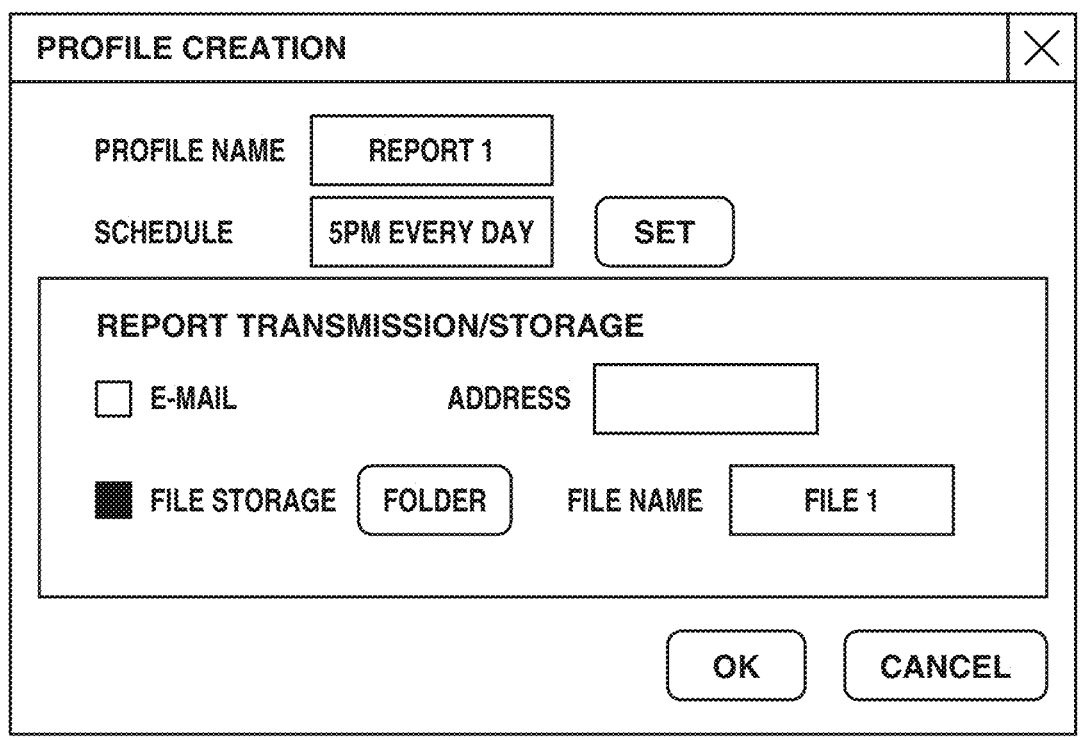
FIG. 9 is a diagram illustrating a profile creation screen provided by the device management server.

The profile is created through a UI illustrated in FIG. 9. A schedule for how often reporting is performed, and how to transmit or store a report are selected. In a case where "E-mail" is selected, an e-mail address is to be set. In a case where "File Storage" is selected, a file name is to be set.

After a profile is selected and an OK button is pressed on the above-described profile selection screen, the task is registered for the target device. FIG. 8A illustrates an example of display of the task. More specifically, FIG. 8A illustrates an example in which the task "Report 1" is registered and is operated at 5 pm every day. In addition, an execution result of the task is displayed as a log. Through these series of settings, a reporting task is created for the selected device, and the status of the task can be checked thereafter.

Figure 7B:
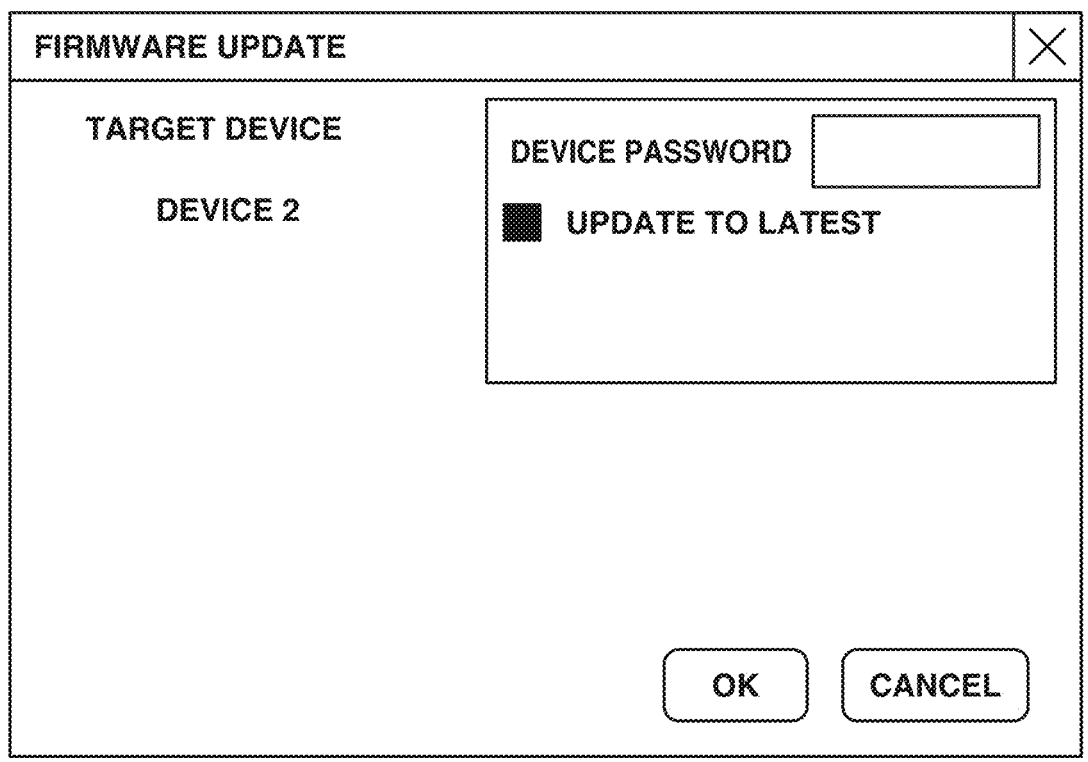

Next, as an example of the temporary task, a firmware update task will be described with reference to FIG. 7B.

When selecting "Firmware Update" on the screen illustrated in FIG. 6, the user then sets a device password and selects whether to update the firmware to the latest version or only check the latest firmware. At this time, the selected target device is displayed, and the user can set a password and check an "Update to Latest" checkbox. In a case where the user does not check the "Update to Latest" checkbox, only checking the latest firmware is performed. After the OK button is pressed, the device management server 1000 accesses a connectable server that supplies the firmware, and checks the latest firmware or updates the firmware. Similarly to the above-described reporting task, the firmware update task is displayed when "Temporary Task" is selected on the task display screen illustrated in FIG. 8A. Through these series of settings, a firmware update task is created and executed for the selected device, and the status of the task can be checked thereafter.

Each step in processing performed by the device management server 1000, which will be described below with reference to flowcharts illustrated in FIGS. 10 to 13, is implemented by the CPU 10 loading the device management software from the HDD 19, the ROM 11, or the like into the RAM 12 and then executing the software.

Figure 10:
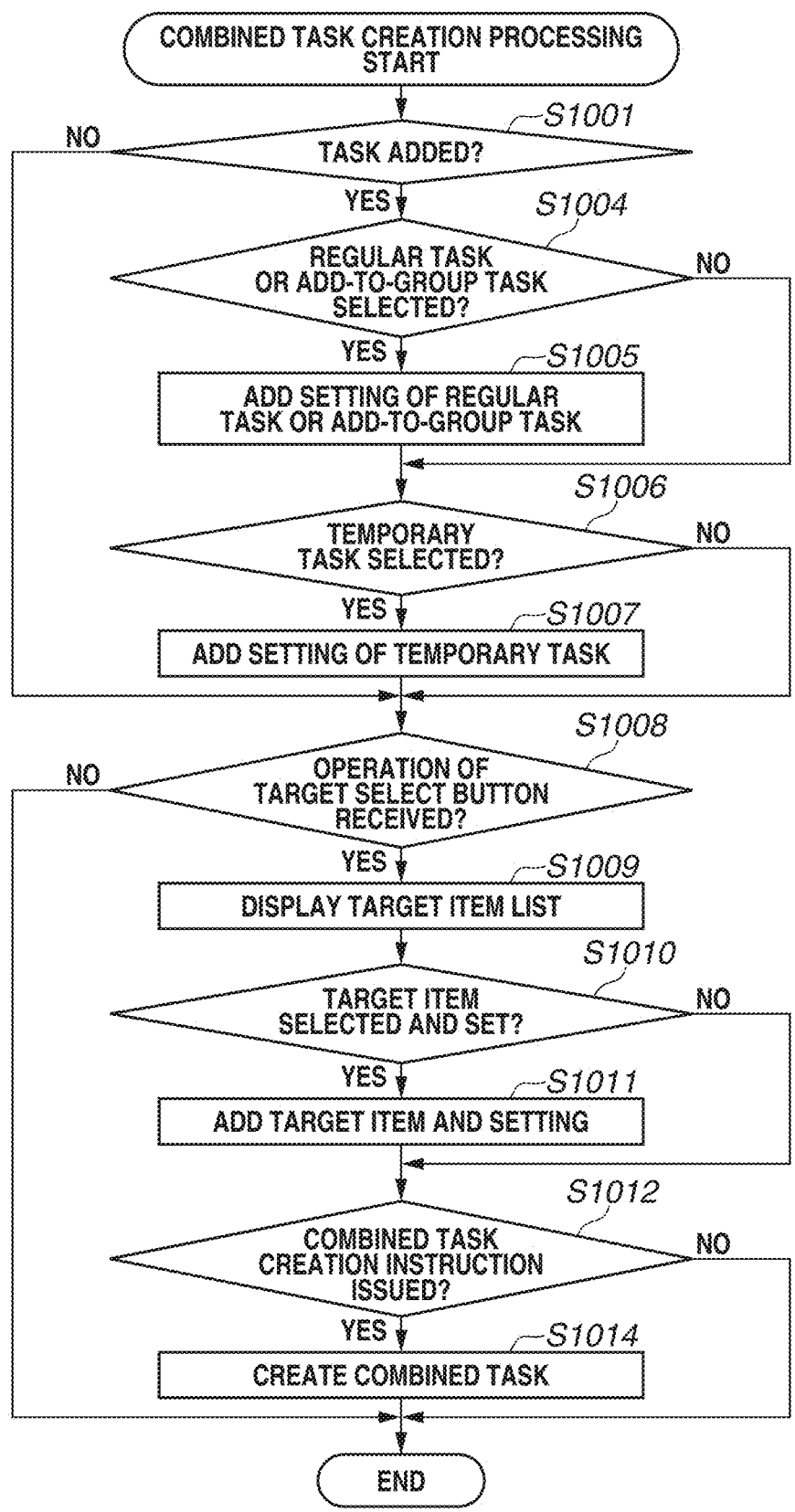
FIG. 10 is a flowchart illustrating combined task creation processing according to one or more aspects of the present disclosure.
Figure 11:
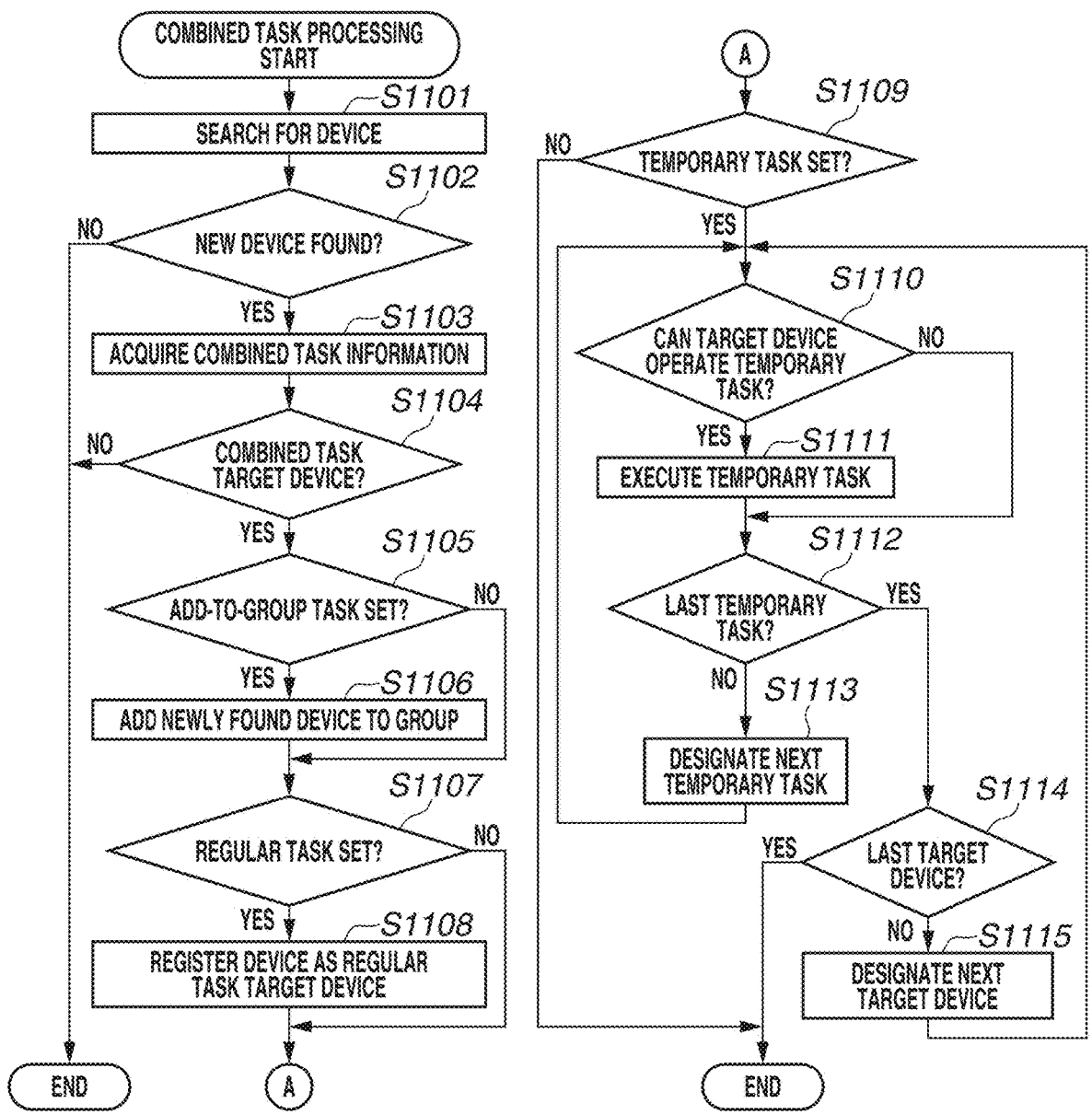
FIG. 11 is a flowchart illustrating combined task processing according to one or more aspects of the present disclosure.

Combined task processing according to a first exemplary embodiment of the present disclosure, which is performed by the device management server 1000, will be described next with reference to the flowcharts illustrated in FIGS. 10 and 11. The description of the processing will be supplemented by using operation examples illustrated in FIG. 5B, FIGS. 8A to 8D, and FIGS. 15A to 15D.

A combined task is a new type of task in which a plurality of tasks is combined and successively executed, and corresponds to a third type task. For example, first, a device search task is executed regularly based on a set schedule. In a case where a device that satisfies a condition is newly found, at least one task is father executed for the newly found device. The task(s) to be further executed and the contents thereof are set in advance in the combined task.

Figure 15A:
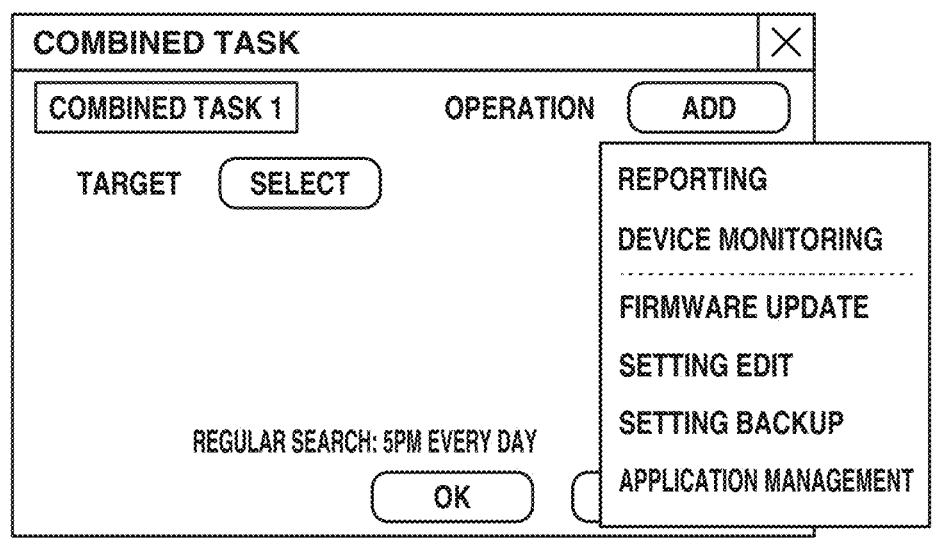
FIGS. 15A to 15G are diagrams each illustrating an example of a combined task creation screen provided by the device management system.

When the device management server 1000 is to create a combined task, "Combined Task" is selected first on the task display screen. FIG. 8B illustrates an example of the screen. In a case where a Create button is selected on the screen illustrated in FIG. 8B, a combined task creation screen illustrated in FIG. 15A is displayed. On this screen, an operation for setting a task to be added to the combined task is received, for example.

In step S1001, the combined task control unit 34 determines whether an operation for adding a task to the combined task is included in the operation received via the screen illustrated in FIG. 15A. In a case where the operation for adding a task is included (YES in step S1001), the processing proceeds to step S1004. Otherwise (NO in step S1001), the processing proceeds to step S1008.

In step S1004, the combined task control unit 34 determines whether the added task is a regular task or an add-to-group task. In a case where the added task is a regular task or the add-to-group task (YES in step S1004), the processing proceeds to step S1005. Otherwise (NO in step S1004), the processing proceeds to step S1006. In step S1005, the combined task control unit 34 adds the setting of the selected regular task or the add-to-group task, to the combined task.

Examples of the regular task include "reporting" and "device monitoring". The "reporting" task is as described above. The "device monitoring" task is to regularly monitor the state of the target device and transmit an e-mail, for example, when an error occurs. The add-to-group task is to use a function of managing devices as a group and add the device found in the search to a designated device group.

In step S1006, the combined task control unit 34 determines whether the added task is a temporary task. In a case where a temporary task is added (YES in step S1006), the setting of the temporary task is added to the combined task in step S1007. In a case where a temporary task is not added (NO in step S1006), the processing proceeds to step S1008.

Examples of the temporary task include a "firmware update", "setting edit", "setting back", and "application management".

The "setting edit" task is to transmit items settable in the target device, such as IP setting and location information, to the device. The "setting backup" task is to store set items, such as an address book and print settings, in a specific HDD specified as a storage destination. The "application management" task is to validate applications and functions running on the target device. To validate the applications and the functions, it is possible to browse a specific area in the HDD to specify a license file.

Figure 15B:
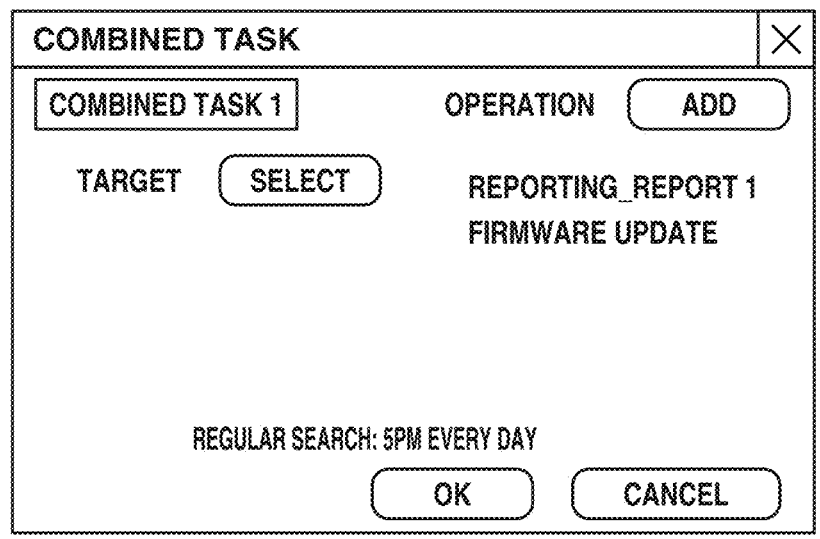

FIG. 15B illustrates a display example in which the "reporting" task, which is a regular task, and the "firmware update" task, which is a temporary task, are set in the combined task. This setting enables regular "reporting" to be set for the device newly found in the search, and also enables "firmware update" to be performed at the timing when the device is newly found.

In step S1008, the combined task control unit 34 determines whether an operation of a "Target" Select button is received via the screen illustrated in FIG. 15B. This operation is performed to set a condition for the device search. In a case where the operation of the Select button is received (YES in step S1008), the processing proceeds to step S1009. Otherwise (NO in step S1008), the processing ends. The settings for the combined task are stored at the time of end of the processing. Even in a case where the "Target" setting is not performed, the stored settings can be called and the "Target" setting can be performed later.

Figure 15C:
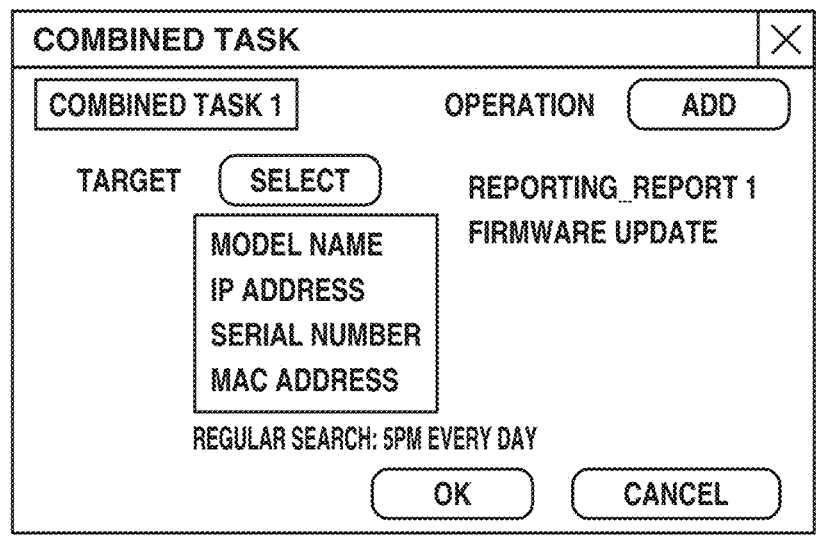

In step S1009, the combined task control unit 34 displays a list of items for setting the condition, on a screen illustrated in FIG. 15C. Examples of the items include Model Name, IP Address, Serial Number, and Media Access Control (MAC) Address. The user selects at least one of the items and performs setting for each of the selected item(s). In a case where the user selects "Model Name", the user sets a model name by specifying a part or all of the name of the model that the user wishes to find, using alphanumeric characters or a character string. In a case where the user selects "IP Address", the user sets an IP address by specifying one or more IP addresses or an IP address range. In a case where the user selects "Serial Number" or "MAC Address", the user finds and specifies data. The user can perform the setting manually or by importing data from an outside source.

In step S1010, the combined task control unit 34 determines whether the target item is selected and set. In a case where the target item is selected and set (YES in step S1010), the processing proceeds to step S1011. Otherwise (NO in step S1010), the processing proceeds to step S1012. In step S1011, the combined task control unit 34 adds at least one selected target item and the setting thereof, to the combined task.

In step S1012, the combined task control unit 34 determines whether a combined task creation instruction is issued. More specifically, the combined task control unit 34 determines whether the operation of the OK button is input via a screen illustrated in FIG. 15D. In a case where a combined task creation instruction is issued (YES in step S1012), the processing proceeds to step S1014. In step S1014, the combined task control unit 34 creates a combined task based on the processing in steps S1005, S1007, and S1011, and stores the combined task in the combined task storage unit 342. The processing then ends.

Figure 8C:
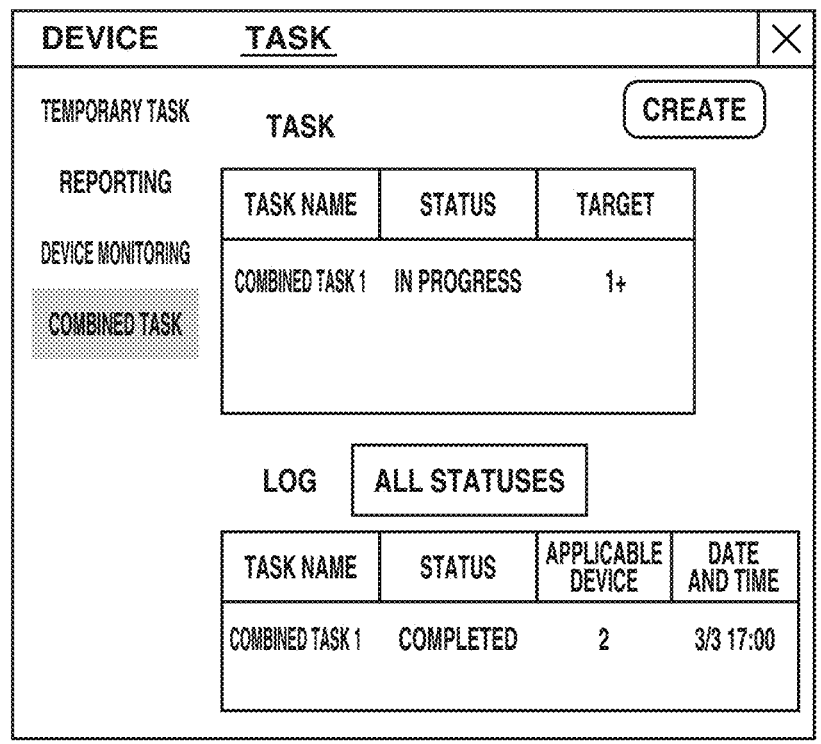
Figure 8D:
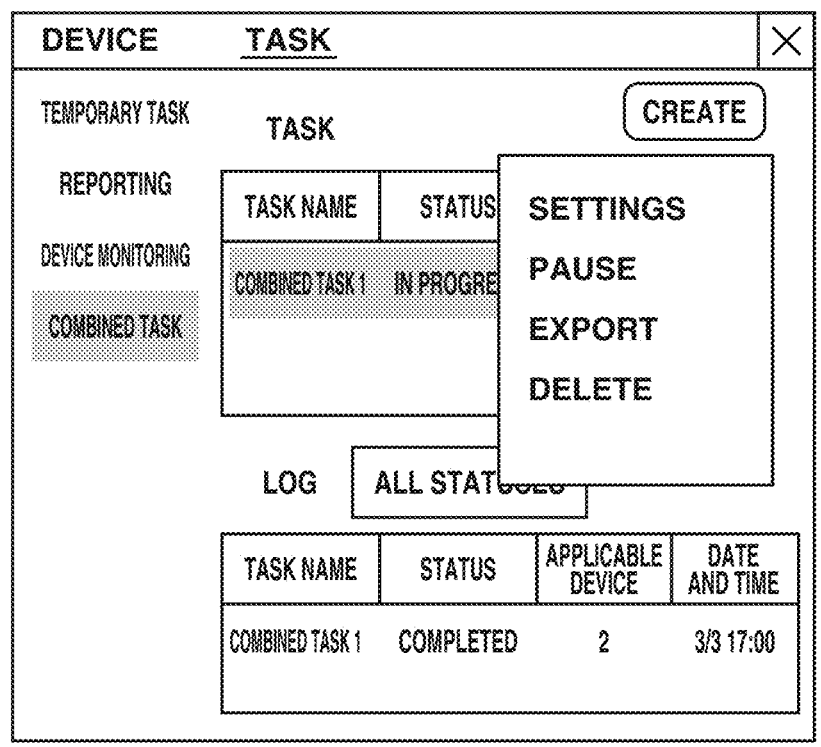
Figure 15D:
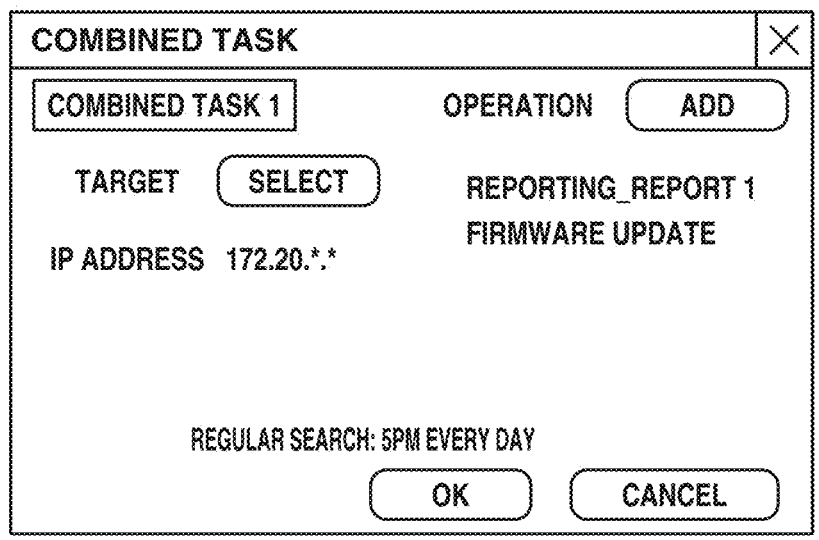

The created combined task (e.g., Combined Task 1) can be confirmed as being in progress on the task display screen, as illustrated in FIG. 8C. In the example of FIG. 8C, the number of target devices is more than one and is thus displayed as "1+". When "Combined Task 1" is selected, a list of available operations is displayed. FIG. 8D illustrates an example of the display of the list. When "Settings" is selected from the list, setting contents similar to those on the screen in FIG. 15D are displayed.

"Pause", "Delete", and "Export" can also be selected from the available operation list.

Processing performed at the time of the regular search included in the created combined task will be described with reference to FIG. 11.

In step S1101, the device connection unit 311 transmits a search packet to search for a new device on the network. The search task included in the combined task is to perform search processing automatically and regularly based on a preset schedule. The schedule is optionally changeable. In step S1102, the combined task control unit 34 determines whether a new device having new identification information, for example, a device newly installed on the network has been found. In a case where a new device has been found (YES in step S1102), the processing proceeds to step S1103. Otherwise (NO in step S1102), the processing ends.

It is assumed here that a Device 4 has been newly found in the search. FIG. 5B illustrates an example of a screen displayed at this time.

In step S1103, the combined task control unit 34 acquires, from the combined task storage unit 342, information about the set combined task. More specifically, the combined task control unit 34 acquires the condition for determining a combined task target device, the add-to-group task setting, the regular task information, and the temporary task setting, for example.

In step S1104, the combined task control unit 34 determines whether the new device is the combined task target device, based on, for example, the condition set via the screens of FIGS. 15C and 15D and the information acquired through the network from the new device found in step S1102. In a case where the new device is determined as the target device (YES in step S1104), the processing proceeds to step S1105. Otherwise (NO in step S1104), the processing ends.

In a case where the condition specifies an IP address of "172.20.*.*", the Device 4 is determined as the target device because the IP address of the Device 4 is "172.20.101.200".

In step S1105, the combined task control unit 34 determines whether the add-to-group task is set. In a case where the add-to-group task is set (YES in step S1105), the processing proceeds to step S1106. Otherwise (NO in step S1105), the processing proceeds to step S1107. In step S1106, the combined task control unit 34 adds the device to the designated group.

In step S1107, the combined task control unit 34 determines whether a regular task for the new device is set in the combined task. In a case where the regular task is set (YES in step S1107), the processing proceeds to step S1108. Otherwise (NO in step S1107), the processing proceeds to step S1109. In step S1108, the combined task control unit 34 registers the device as the target device of the regular task set in the combined task. In the example of FIG. 15B, the device is registered as the target device of the regular task that uses the reporting function. Furthermore, in a case where a plurality of regular tasks is set in the combined task, the device is registered as the target device of each of the plurality of regular tasks.

In step S1109, the combined task control unit 34 determines whether a temporary task is set. In a case where a temporary task is set (YES in step S1109), the processing proceeds to step S1110. Otherwise (NO in step S1109), the processing ends.

In step S1110, the device control unit 31 determines whether the target device can operate the temporary task. In a case where the target device can operate the temporary task (YES in step S1110), the processing proceeds to step S1111. In a case where the target device cannot operate the temporary task (NO in step S1110), the processing proceeds to step S1112. Settable temporary tasks differ from device to device because of functional limitation. For example, in a case where a newly found device is a model that does not support software update management through the network, it is determined in step S1110 that the device cannot operate the firmware update task or the application management task.

It is assumed that the Device 4 can operate "firmware update" and "setting edit" as temporary tasks.

In step S1111, the device control unit 31 controls the execution of the temporary task. More specifically, depending on the task type, the device control unit 31 requests the execution via the firmware update management unit 316, the setting management unit 317, or the application management unit 318. In this example, as described above, the firmware update management unit 316 acquires the latest firmware by accessing the server that supplies the firmware, and then instructs the Device 4 to update the firmware.

In step S1112, the combined task control unit 34 determines whether the temporary task is the last one set in the combined task. In a case where the temporary task is the last one (YES in step S1112), the processing proceeds to step S1114. In a case where the temporary task is not the last one, namely, there is still a temporary task set in the combined task (NO in step S1112), the processing proceeds to step S1113. In step S1113, the combined task control unit 34 designates the next set temporary task. The processing then returns to step S1110.

In step S1114, the combined task control unit 34 determines whether the device is the last target device found in the search. In a case where the device is the last target device (YES in step S1114), the processing ends. In a case where the device is not the last target device, namely, there is still a target device (NO in step S1114), the processing proceeds to step S1115. In step S1115, the combined task control unit 34 designates the next target device. The processing then returns to step S1110.

The setting of the combined task can be exported by the function of the device management software, and a device management server operating in another environment can import the setting. In a second exemplary embodiment, export processing for exporting the combined task created in the first exemplary embodiment will be described. More specifically, the export processing excludes a part of the temporary tasks from the combined task before export.

Figure 12:
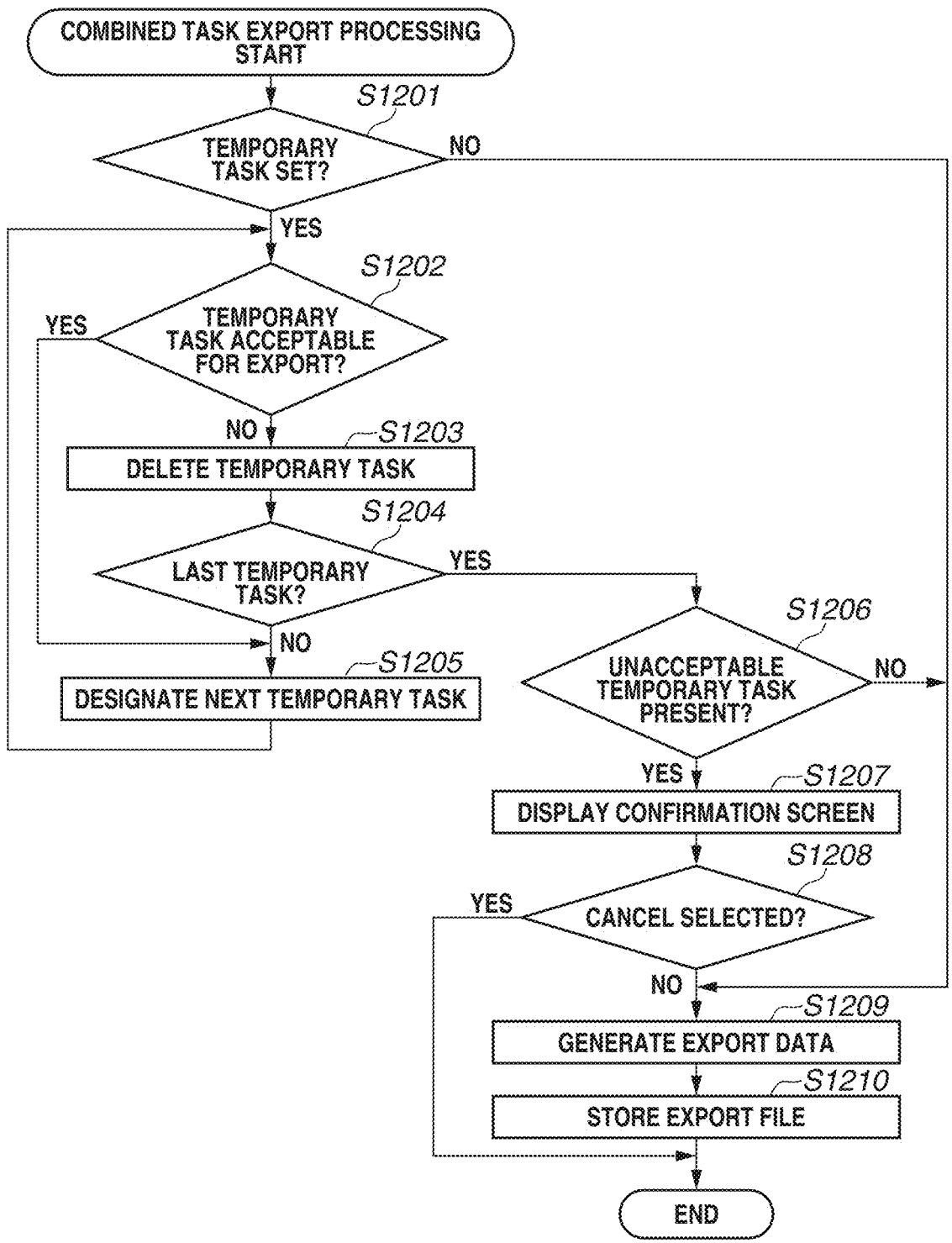
FIG. 12 is a flowchart illustrating combined task export processing according to one or more aspects of the present disclosure.

The export processing performed by the device management server 1000 will be described with reference to FIG. 12.

Figure 8E:
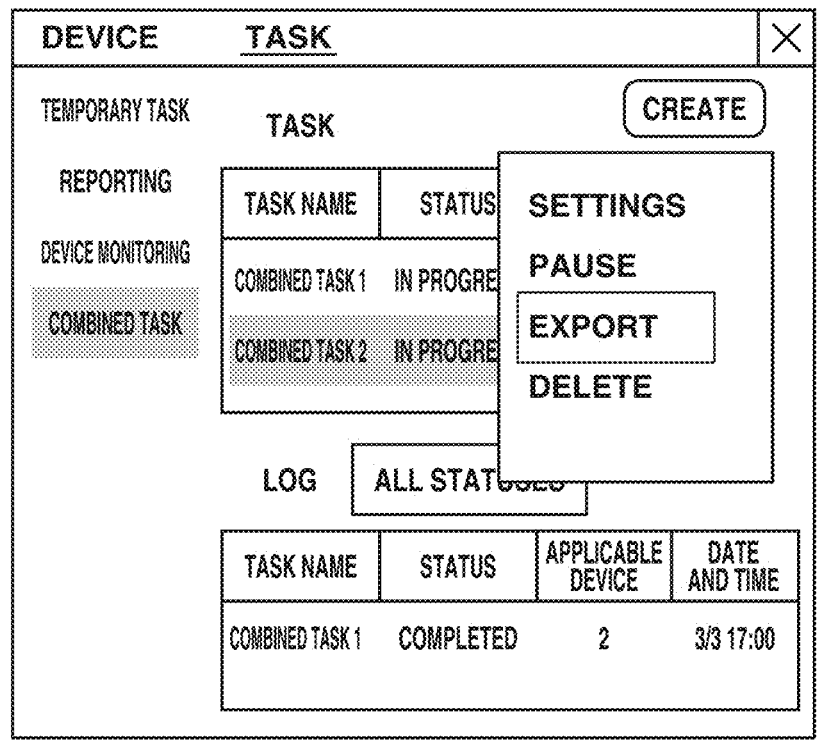
Figure 15E:
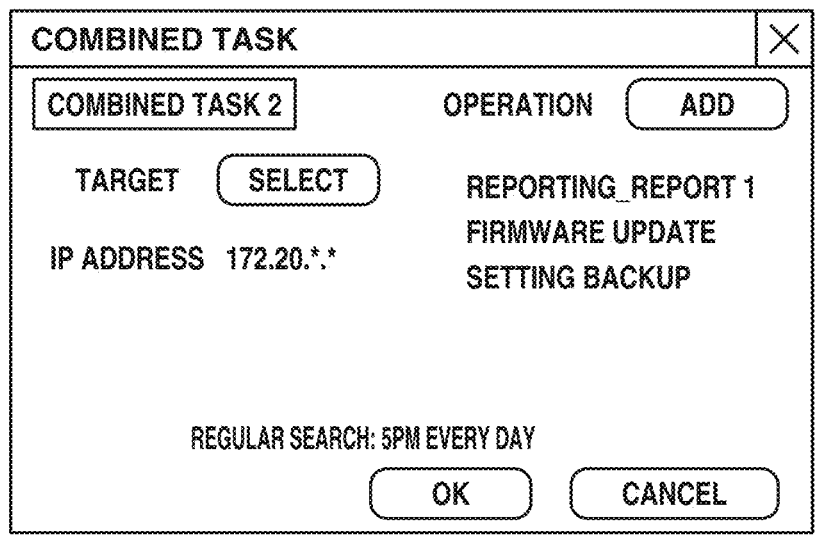

A specific combined task can be selected and then managed using a menu on a combined task display screen illustrated in FIG. 8E. In this example, a Combined Task 2 having the contents illustrated in FIG. 15E is created. A case where "Combined Task 2" is selected and then "Export" is selected from the menu on the screen of FIG. 8E will be described as an example.

In step S1201, the combined task control unit 34 determines whether a temporary task is set in the selected combined task. In a case where a temporary task is set (YES in step S1201), the processing proceeds to step S1202. Otherwise (NO in step S1201), the processing proceeds to step S1209.

In step S1202, the combined task control unit 34 determines whether the temporary task set in the combined task is acceptable for export. In a case where the temporary task is acceptable for export (YES in step S1202), the processing proceeds to step S1205. Otherwise (NO in step S1202), the processing proceeds to step S1203.

For example, in the "application management" task, it is necessary to specify the license file for a specific target device. Thus, even if another apparatus imports the task, the apparatus is likely to fail to execute the task. In addition, a temporary task using the data that is managed only in the storage device of the device management server 1000 serving as the export source is determined to be unacceptable for export. In the case of the combined task illustrated in FIG. 15E, the "setting backup" task is determined to be unacceptable for export.

In step S1203, the combined task control unit 34 deletes information about the temporary task from the combined task information.

In step S1204, the combined task control unit 34 determines whether the temporary task is the last one set in the combined task. In a case where the temporary task is the last one (YES in step S1204), the processing proceeds to step S1206. In a case where there is still a temporary task set in the combined task (NO in step S1204), the processing proceeds to step S1205. In step S1205, the combined task control unit 34 designates the next set temporary task. The processing then returns to step S1202.

Figure 15F:
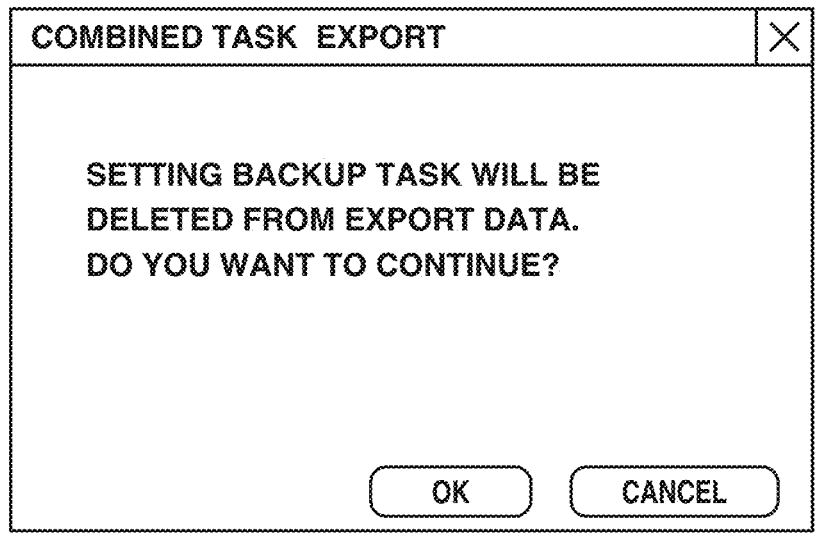

In step S1206, the combined task control unit 34 determines whether there is an unacceptable temporary task for export. In a case where there is an unacceptable temporary task (YES in step S1206), the processing proceeds to step S1207. Otherwise (NO in step S1206), the processing proceeds to step S1209. In step S1207, the combined task control unit 34 controls the combined task display unit 304 to display a confirmation screen asking whether to cancel the export, as illustrated in FIG. 15F. The example of FIG. 15F indicates that the "setting backup" task is to be deleted at the time of export.

In step S1208, the combined task control unit 34 determines whether a Cancel button is selected. In a case where the Cancel button is selected (YES in step S1208), the processing ends. In a case where the Cancel button is not selected (NO in step S1208), the processing proceeds to step S1209.

In step S1209, the combined task control unit 34 generates export data from the combined task information including the settings of the tasks other than the task deleted in step S1203. In step S1210, the combined task control unit 34 stores the export data with a specified file name in a specified storage destination.

Figure 15G:
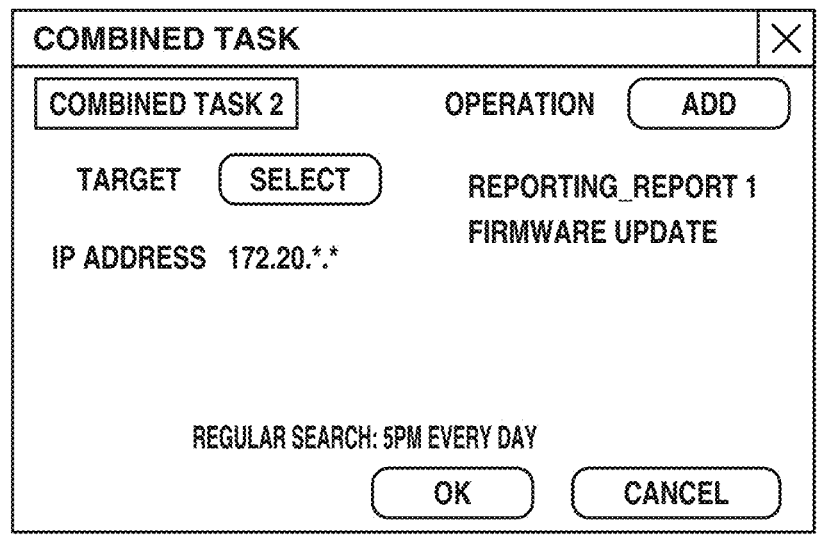

FIG. 15G illustrates an example in which another personal computer (PC) imports and displays the export file. In this example, the combined task in which "reporting" and "firmware update" are set is imported.

A third exemplary embodiment will be described next. When a combined task is created in the first exemplary embodiment, there may be a case where the target of each temporary task is limited. Processing for limiting the target will be described with reference to FIG. 13. Processing different from the processing according to the first exemplary embodiment will be described in detail.

Figure 13:
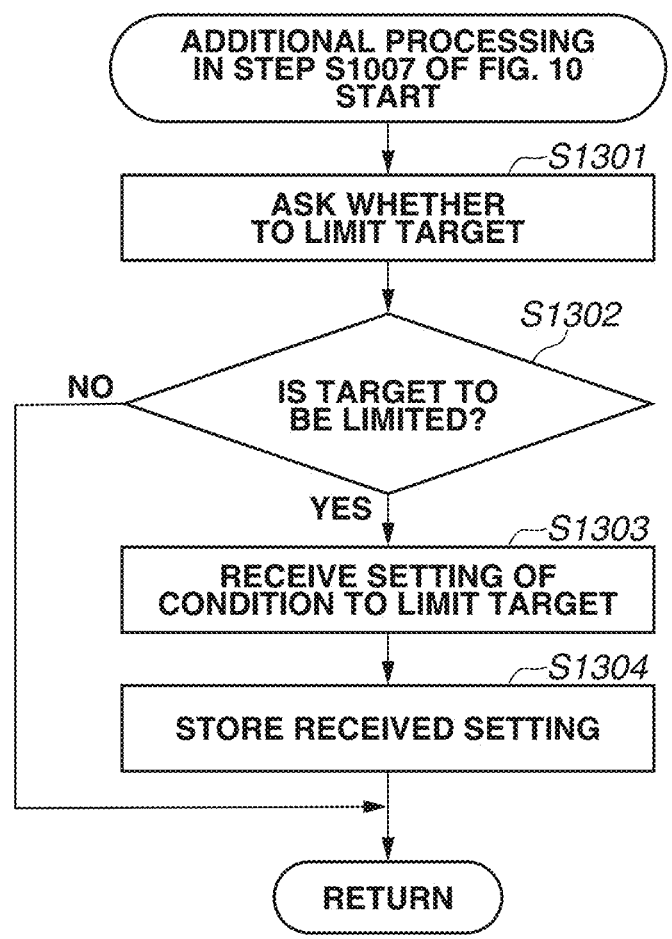
FIG. 13 is a flowchart illustrating processing for limiting the target of a task according to one or more aspects of the present disclosure.

FIG. 13 illustrates the processing to be added to the processing described with reference to step S1007 of FIG. 10.

In step S1301, the combined task control unit 34 controls the combined task display unit 304 to display a screen (not illustrated) asking whether to limit the target of the temporary task before the temporary task is added to the combined task. In step S1302, the combined task control unit 34 determines whether the limitation of the target is selected. In a case where the limitation is selected (YES in step S1302), the processing proceeds to step S1303. Otherwise (NO in step S1302), the processing returns to the processing in step S1007, and then proceeds to step S1008.

In step S1303, the combined task control unit 34 receives the setting of the condition for limiting the target of the temporary task to be added. The combined task control unit 34 receives the setting from the user by causing the combined task display unit 304 to display a screen similar to the target selection screen illustrated in FIG. 15C. More specifically, the combined task control unit 34 receives the selection of an item (e.g., model name, IP address, serial number, or MAC address) for limiting the target, and the setting of a value range of the selected item. In step S1304, the combined task control unit 34 stores the received setting in association with the temporary task to be added. The processing then returns to the processing in step S1007.

According to this processing, in a case where a device satisfying both the condition for determining the combined task target device (e.g., "172.20.*.*"), which has been described with reference to FIGS. 15C and 15D in the first exemplary embodiment, and the setting stored in step S1304 has been found, the temporary task described with reference to FIG. 13 is to be executed.

A fourth exemplary embodiment will be described next. In a case where "Model Name" is selected as the target item in steps S1009 to S1011 in the combined task creation processing according to the first exemplary embodiment, a model name may be selected from the device models included in the existing device list. This selection processing will be described with reference to FIG. 14.

Figure 14:
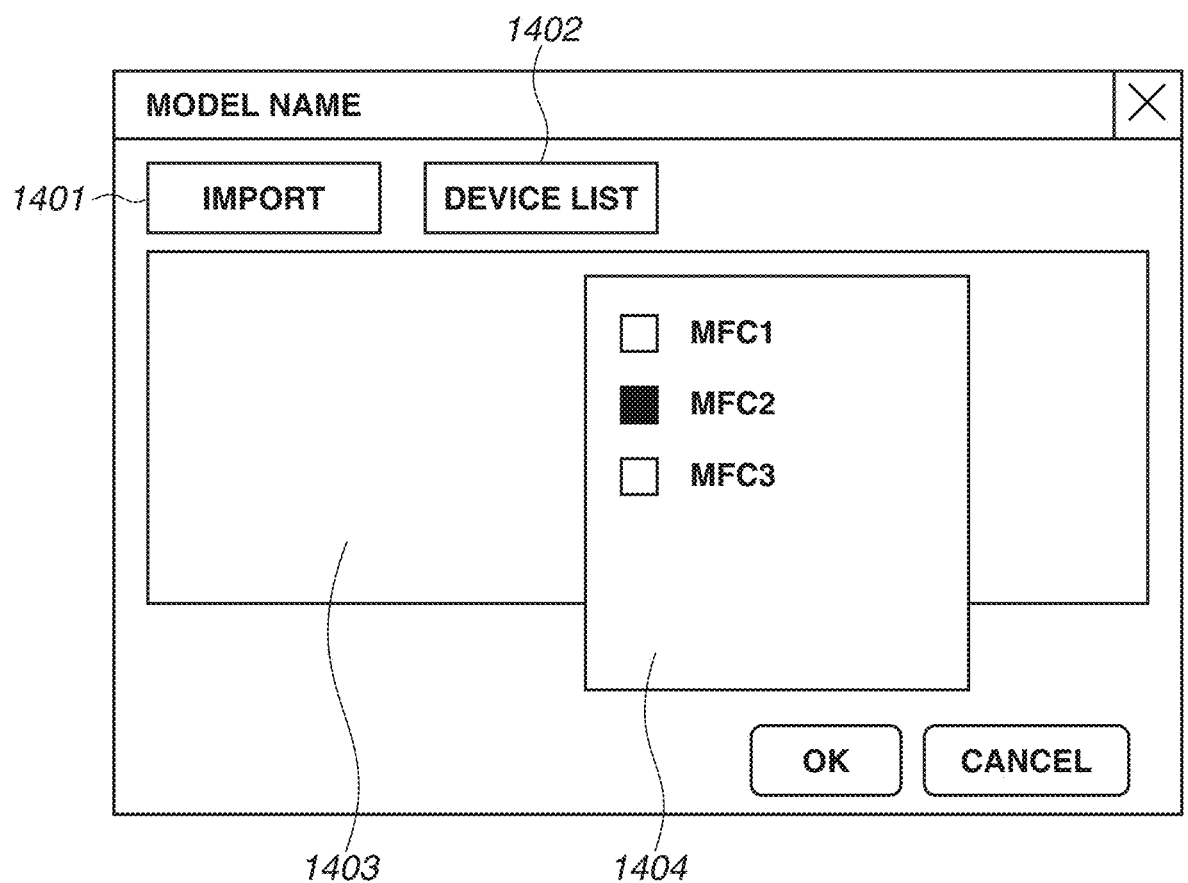
FIG. 14 is a diagram illustrating an example of a model name selection screen according to one or more aspects of the present disclosure.

FIG. 14 illustrates an example of a screen that is additionally provided when the item "Model Name" is selected via the screen illustrated in FIG. 15C.

The user can set a model name as the condition for determining a combined task target device, using any of an import button 1401, a device list button 1402, and an entry field 1403 on the screen illustrated in FIG. 14.

In a case where the user selects the import button 1401, the user can set a model name by importing the model name information of the model name list from the file stored in the local area of an apparatus optionally operated by the user. The imported model name information is to be displayed in the entry field 1403. In a case where the user selects the device list button 1402, a model name list 1404 is displayed. The model name list 1404 displays the model names of the devices included in the device list currently managed by the device management software. The user can select at least one model name from the list to reflect the selected model name in the device list button 1402. Furthermore, the user can select the entry field 1403 to directly and manually enter a model name therein.

When the OK button is selected on the screen illustrated in FIG. 14, the model name is reflected as the combined task target.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2020-103371, filed Jun. 15, 2020, which is hereby incorporated by reference herein in its entirety.

What is claimed is:

1. A management apparatus comprising,
at least one memory storing instructions, and
at least one processor executing the instructions causing the management apparatus to:
receive a first designation related to condition information that is based on at least one of an IP address, a model name, a serial number and a MAC address;
receive a second designation related to a license file to be used for enabling software for an image processing apparatus,
wherein the second designation is a designation for an image processing apparatus that is newly found by a search, after the reception of the second designation, on a network and that satisfies the condition information, and
manage, as a task, a set of the first designation and the second designation,
wherein a status of the managed task is capable of being switched, based on a user operation, among a working status in which processing that is corresponding to the managed task and includes searching for an image processing apparatus that satisfies the condition information is performed and a stop status in which the processing is not performed.

2. The management apparatus according to claim 1, wherein the instructions further cause the management apparatus to export information about the managed task.

3. The management apparatus according to claim 1, wherein the second designation further includes a setting related to a firmware update.

4. The management apparatus according to claim 1, wherein the second designation further includes at least one of a setting related to an edit of setting values of the image processing apparatus and a setting related to a backup of data stored in the image processing apparatus.

5. The management apparatus according to claim 1, wherein the instructions further cause the management apparatus to provide a device list including information of a plurality of image processing apparatuses that are managed by the management apparatus.

6. The management apparatus according to claim 5,
wherein the instructions further cause the management apparatus to provide a screen for setting an instruction to be executed for one image processing apparatus selected from the device list, and
wherein, on the provided screen, a reporting, a firmware update, an edit of setting values or a backup of data is settable as the instruction for the selected image processing apparatus.

7. The management apparatus according to claim 1, wherein the instructions further cause the management apparatus to receive a third designation related to a timing of the search.

8. The management apparatus according to claim 7, wherein the timing includes regular searches as an option.

9. The management apparatus according to claim 1, wherein the image processing apparatus has at least one of a scanner and a printer.

10. The management apparatus according to claim 1, wherein the instructions further cause the management apparatus to transmit license information based on the license file to the image processing apparatus that is newly found by the search.

11. A management apparatus comprising,
at least one memory storing instructions, and
at least one processor executing the instructions causing the management apparatus to:
receive a first designation of at least one of an IP address, a serial number, a MAC address and a model name from a user;
receive a second designation related to a plurality of settings including a setting concerning license information for enabling software concerning a printer from the user;
perform registration of a task, based on the received first designation and the received second designation; and
execute controls corresponding to the plurality of settings for a printer that is found by searching, after the registration, for a printer on a network and that corresponds to the received first designation,
wherein, as the execute controls, control such that the license information is transmitted to the printer is performed, and
wherein a status of the task subject to the registration is capable of being switched, based on a user operation, among a working status in which processing that is corresponding to the task and includes the searching is performed and a stop status in which the processing is not performed.

12. The management apparatus according to claim 11, wherein the printer has a scanner.

13. The management apparatus according to claim 11, wherein the instructions further cause the management apparatus to receive a third designation related to a timing of the searching.

14. A method for a management apparatus comprising,
receiving a first designation related to condition information that is based on at least one of an IP address, a mode name, a serial number and a MAC address;
receiving a second designation related to a license file to be used for enabling software for an image processing apparatus,
wherein the second designation is a designation for an image processing apparatus that is newly found by a search, after the reception of the second designation, on a network and that satisfies the condition information, and
manage, as a task, a set of the first designation and the second designation,
wherein a status of the managed task is capable of being switched, based on a user operation, among a working status in which processing that is corresponding to the managed task and includes searching for an image processing apparatus that satisfies the condition information is performed and a stop status in which the processing is not performed.

15. The method according to claim 14, further comprising exporting information about the managed task.

16. The method according to claim 14, wherein the second designation further includes a setting related to a firmware update.

17. The method according to claim 14, wherein the second designation further includes at least one of a setting related to an edit of setting values of the image processing apparatus and a setting related to a backup of data stored in the image processing apparatus.

18. The method according to claim 14, further comprising providing a device list including information of a plurality of image processing apparatuses that are managed by the management apparatus.

19. The method according to claim 18, further comprising providing a screen for setting an instruction to be executed for one image processing apparatus selected from the device list, wherein, on the provided screen, a reporting, a firmware update, an edit of setting values or a backup of data is settable as the instruction for the selected image processing apparatus.

20. The method according to claim 14, further comprising receiving a third designation related to a timing of the search.

21. The method according to claim 20, wherein the timing includes regular searches as an option.

22. The method according to claim 14, wherein the image processing apparatus has at least one of a scanner and a printer.

23. The method according to claim 14, further comprising transmitting, license information based on the license file to the image processing apparatus that is newly found by the search.

24. A non-transitory computer readable storage medium storing a computer program for making a computer execute a method, the method comprising, receiving a first designation related to condition information that is based on at least one of an IP address, a model name, a serial number and a MAC address;

receiving a second designation related to a license file to be used for enabling software for an image processing apparatus, wherein the second designation is a designation for an image processing apparatus that is newly found by a search, after the reception of the second designation, on a network and that satisfies to the condition information, and managing, as a task, a set of the first designation and the second designation, wherein a status of the managed task is capable of being switched, based on a user operation, among a working status in which processing that is corresponding to the managed task and includes searching for an image processing apparatus that satisfies the condition information is performed and a stop status in which the processing is not performed.

25. The non-transitory computer readable storage medium according to claim 24, wherein the method further comprises exporting information about the managed task.

26. The non-transitory computer readable storage medium according to claim 24, wherein the second designation further includes a setting related to a firmware update.

27. The non-transitory computer readable storage medium according to claim 24, wherein the second designation further includes at least one of a setting related to an edit of setting values of the image processing apparatus and a setting related to a backup of data stored in the image processing apparatus.

28. The non-transitory computer readable storage medium according to claim 24, wherein the method further comprises providing a device list including information of a plurality of image forming apparatuses.

29. The non-transitory computer readable storage medium according to claim 28, wherein the method further comprises providing a screen for setting an instruction to be executed for one image processing apparatus selected from the device list, wherein, on the provided screen, a reporting, a firmware update, an edit of setting values or a backup of data is settable as the instruction for the selected image processing apparatus.

30. The non-transitory computer readable storage medium according to claim 24, wherein the method further comprises receiving a third designation related to a timing of the search.

31. The non-transitory computer readable storage medium according to claim 30, wherein the timing includes regular searches as an option.

32. The non-transitory computer readable storage medium according to claim 24, wherein the image processing apparatus has at least one of a scanner and a printer.

33. The non-transitory computer readable storage medium according to claim 24, wherein the method further comprises transmitting, license information based on the license file to the image processing apparatus that is newly found by the search.

34. A method for a management apparatus comprising, receiving a designation of a at least one of an IP address, a serial number, a MAC address and a model name from a user;

receiving a designation concerning license information for enabling software concerning a printer from the user;

performing as a task, registration based on the received designation of the at least one and the received designation concerning the license information; and performing control such that the license information is transmitted to a printer that is found by searching, after the registration, for a printer on a network and that corresponds to the at least one, and wherein a status of the task subject to the registration is capable of being switched, based on a user operation, among a working status in which processing that is corresponding to the task and includes the searching is performed and a stop status in which the processing is not performed.

35. A non-transitory computer readable storage medium storing a computer program for making a computer execute a method, the method comprising, receiving a designation of a at least one of an IP address, a serial number, a MAC address and a model name from a user;

receiving a designation concerning license information for enabling software concerning a printer from the user;

performing as a task, registration based on the received designation of the at least one and the received designation concerning the license information; and performing control such that the license information is transmitted to a printer that is found by searching, after the registration, for a printer on a network and that corresponds to the at least one, and wherein a status of the task subject to the registration is capable of being switched, based on a user operation, among a working status in which processing that is corresponding to the task and includes the searching is performed and a stop status in which the processing is not performed.

36. A management apparatus comprising,
at least one memory storing instructions, and
at least one processor executing the instructions causing the management apparatus to:

receive a first designation for designating a model name;
receive a second designation related to a license file to be used for enabling software for an image processing apparatus,
wherein the second designation is a designation for an image processing apparatus that is newly found by a search, after the reception of the second designation, on a network and that has the model name designated by the first designation, and
transmit license information based on the license file to the image processing apparatus that is newly found by the search.

37. The management apparatus according to claim 36, wherein the instructions further cause the management apparatus to manage, as a task, a set of the first designation and the second designation,
wherein a status of the managed task is capable of being switched, based on a user operation, among a working status in which processing that is corresponding to the managed task and includes searching for an image processing apparatus that satisfies the model name designated by the first designation is performed and a stop status in which the processing is not performed.

38. The management apparatus according to claim 36, wherein an image processing apparatus that has the model name designated by the first designation is found by the management apparatus having performed the search by acquiring device information from the image processing apparatus on the network.

39. The management apparatus according to claim 36, wherein the instructions further cause the management apparatus to receive a third designation related to a timing of the search.

40. The management apparatus according to claim 39, wherein the timing includes regular searches as an option.

41. The management apparatus according to claim 36, wherein the image processing apparatus has at least one of a scanner and a printer.

42. A method for a management apparatus comprising,
receiving a first designation for designating a model name;
receiving a second designation related to a license file to be used for enabling software for an image processing apparatus,
wherein the second designation is a designation for an image processing apparatus that is newly found by a search, after the reception of the second designation, on a network and that has the model name designated by the first designation, and
transmitting license information based on the license file to the image processing apparatus that is newly found by the search.

43. The method according to claim 42, wherein as a task, a set of the first designation and the second designation is managed,
wherein a status of the managed task is capable of being switched, based on a user operation, among a working status in which processing that is corresponding to the managed task and includes searching for an image processing apparatus that satisfies the model name designated by the first designation is performed and a stop status in which the processing is not performed.

44. The method according to claim 42, wherein an image processing apparatus that has the model name designated by the first designation is found by the management apparatus having performed the search by acquiring device information from the image processing apparatus on the network.

45. The method according to claim 42, wherein a third designation related to a timing of the search is received.

46. The method according to claim 45, wherein the timing includes regular searches as an option.

47. The method according to claim 42, wherein the image processing apparatus has at least one of a scanner and a printer.

48. A non-transitory computer readable storage medium storing a computer program for making a computer execute a method, the method comprising:
receiving a first designation for designating a model name;
receiving a second designation related to a license file to be used for enabling software for an image processing apparatus,
wherein the second designation is a designation for an image processing apparatus that is newly found by a search, after the reception of the second designation, on a network and that has the model name designated by the first designation, and
transmitting license information based on the license file to the image processing apparatus that is newly found by the search.

49. The method according to claim 48, wherein as a task, a set of the first designation and the second designation is managed,
wherein a status of the managed task is capable of being switched, based on a user operation, among a working status in which processing that is corresponding to the managed task and includes searching for an image processing apparatus that satisfies the model name designated by the first designation is performed and a stop status in which the processing is not performed.

50. The method according to claim 48, wherein an image processing apparatus that has the model name designated by the first designation is found by the management apparatus having performed the search by acquiring device information from the image processing apparatus on the network.

51. The method according to claim 48, wherein a third designation related to a timing of the search is received.

52. The method according to claim 51, wherein the timing includes regular searches as an option.

53. The method according to claim 48, wherein the image processing apparatus has at least one of a scanner and a printer.

* * * * *